United States Patent [19]
Biel et al.

[11] Patent Number: 4,965,108
[45] Date of Patent: * Oct. 23, 1990

[54] LOW TEMPERATURE IMPACT AND PUNCTURE RESISTANT THERMOPLASTIC FILMS AND BAGS THEREFROM

[75] Inventors: Edward N. Biel, Munster, Ind.; Edward B. Tucker, Palos Hills, Ill.

[73] Assignee: First Brands Corporation, Danbury, Conn.

[*] Notice: The portion of the term of this patent subsequent to Oct. 23, 2007 has been disclaimed.

[21] Appl. No.: 23,446

[22] Filed: Mar. 9, 1987

Related U.S. Application Data

[63] Continuation-in-part of Ser. No. 774,881, Sep. 11, 1985, abandoned.

[51] Int. Cl.$^5$ .............................................. B29B 1/08
[52] U.S. Cl. ................................. 428/35.7; 428/332; 428/476.3; 428/483; 428/500; 428/516
[58] Field of Search ................. 428/500, 516, 35, 483, 428/476.3, 35.7, 332

[56] References Cited

U.S. PATENT DOCUMENTS

| | | | |
|---|---|---|---|
| 4,169,910 | 10/1979 | Graboski | 428/35.2 |
| 4,291,085 | 9/1981 | Ito et al. | 428/215 |
| 4,401,256 | 8/1983 | Krieg | 229/53 |
| 4,488,924 | 12/1984 | Krieg | 156/251 |
| 4,560,598 | 12/1985 | Cowan | 428/35.2 |

FOREIGN PATENT DOCUMENTS

| | | | |
|---|---|---|---|
| 0179639 | 10/1985 | European Pat. Off. | |
| 229476 | 7/1987 | European Pat. Off. | 428/516 |
| 2377948 | 1/1978 | France | |
| 1453621 | 10/1976 | United Kingdom | |

OTHER PUBLICATIONS

Exxon Elastomers for Polyolefin Modification-1975.
Vistanex® Polyisobutylene Properties and Applications-1974.

Primary Examiner—Edith Buffalow
Attorney, Agent, or Firm—Gary L. Warner

[57] ABSTRACT

Thermoplastic films and bag structures having improved low temperature impact and puncture resistance properties and high resistance to heat comprise a film layer comprising a blend of polypropylene copolymer and a material selected from polyisobutylene, very low density polyethylene, polybutylene, and ethylene-methyl acrylate copolymer, and mixtures thereof. The films and bag structures preferably have an outer film layer of a resin material having a melt temperature which is higher than that of the other film layer. The outer film layer material is preferably a polyester or a polyamide. The films and bag structures are particularly suitable for use as frozen food storage containers and for subsequent heating and/or cooking of food therein.

14 Claims, 4 Drawing Sheets

POLYPROPYLENE FILM IMPACT MODIFICATION
EFFECT OF PB,EMA,PIB,VLDPE AT 32°F

POLYPROPYLENE FILM PUNCTURE MODIFICATION
EFFECT OF PB, EMA, PIB, VLDPE AT 0° F

FIG. 4

LOW TEMPERATURE IMPACT AND PUNCTURE RESISTANT THERMOPLASTIC FILMS AND BAGS THEREFROM

This application is a continuation-in-part of Ser. No. 06/774881 filed Sep. 11, 1985, now abandoned.

FIELD OF THE INVENTION

This invention relates to thermoplastic films and bag structures made therefrom having improved low temperature impact and puncture resistant properties and high resistance to heat. The invention further relates to film and bag structures comprising two layers of films which are formed from dissimilar thermoplastic resins. The bag structures are particularly suitable for use as frozen food storage containers, and subsequent heating and/or cooking of food therein such as in hot water or in a microwave oven. The bag structures may include an interlocking closure fastening device.

BACKGROUND OF THE INVENTION

In the past, thermoplastic films and bag structures made therefrom for the storage of food in its refrigerated or frozen condition have employed polyethylene as the material of construction. This type of container or bag is particularly convenient for storage of food and food leftovers which are intended for later reheating or cooking. The storage bags have been formed from comparatively low density polyethylene resin, for example, polyethylene having a density of from about 0.910 to about 0.930 grams per cubic centimeter. However, bags made from such low density polyethylene do not have utility for holding food or food leftovers during heating or cooking because the polyethylene film cannot withstand elevated temperatures of about 215° F. or higher. Even at temperatures below said aforementioned range, polyethylene film has a tendency to at least partially melt and stick to the surface of the heating means or vessel.

In order to overcome such above-indicated drawbacks when using polyethylene films, attempts have been made to employ other resins such as polyester films in elevated temperature environments. However, such films have been found to suffer sealing problems, such as providing narrow heat sealing range, a manufacturing process limitation, and are also expensive for disposable bags. In addition, to compensate for thermal weakness, other thermoplastic resins such as polypropylene which has a melting point of between about 314° F. and 325° F., and wherein the film structure is relatively thick, may be employed at elevated cooking temperatures instead of polyethylene. However, although the melt temperature and microwave ovenable properties of thermoplastic resins such as polypropylene are superior to polyethylene, the major weakness of resins such as polypropylene is their lack of low temperature mechanical strength properties. That is, at or around freezing temperatures, polypropylene films are brittle, the impact strength and puncture resistance of the films is low, and the films are susceptible to development of cracks and pinholes therein. This latter deficiency of polypropylene makes it unsatisfactory for use in the cold storage of foods and the handling of such food containers in the frozen state. That is, when rummaging the containers in a freezer, such handling causes the development of stress cracks in the container walls, and ultimately, leaks develop therefrom when the containers are thawed.

It is also known that food packaging films may be formed from a multilayer film such as a laminate of a polyamide and polyethylene wherein an adhesive binder material or layer is provided between the polyethylene film and the polyamide film layers. However, such multilayer film materials are generally deficient when used as a container which can withstand reheating or cooking temperatures in that the thermal resistance of the polyethylene layer is less than desired.

Thus, it would be desirable to provide thermoplastic films and bag structures that could be used as a food storage bag having improved low temperature impact and puncture strength properties. It would also be desirable to obtain multilayer thermoplastic films and bag structures which will provide improved physical strength properties when the films and containers are employed at elevated temperatures, such as when cooking or heating a variety of foods.

SUMMARY OF THE INVENTION

The foregoing criteria for thermoplastic films and bag structures having a variety of uses, but which are particularly well adapted over a wide temperature range to contain food during freezer storage and handling, and also during reheating or cooking foods therein, are met by the present invention.

In one embodiment, the thermoplastic film and bag structure of this invention comprises an inner film layer comprising a blend of a polypropylene copolymer with between about 5 percent and about 40 percent by weight, or between about 5 percent and about 30 percent, of a resin material selected from the group consisting of (a) very low density polyethylene, (b) polybutylene, (c) a copolymer of ethylene-methyl acrylate, and (d) polyisobutylene, based on the weight of the blend; and an outer film layer of a resin material having a melting temperature which is higher than that of the inner film layer.

In a further embodiment, the thermoplastic film and bag structure of this invention comprises an inner film layer comprising a blend of a polypropylene copolymer with between about 5 percent and about 40 percent, or between about 5 to 30 percent, or between about 20 to 40 percent or between about 20 to 30 percent by weight of a mixture of resin materials selected from the group consisting of (a) very low density polyethylene and polybutylene, (b) very low density polyethylene and a copolymer of ethylene-methyl acrylate, (c) very low density polyethylene and polyisobutylene, (d) polybutylene and a copolymer of ethylene-methyl acrylate, (e) polybutylene and polyisobutylene, and (f) a copolymer of ethylene-methyl acrylate and polyisobutylene, based on the weight of the blend; and an outer film layer of a resin material having a melting temperature which is higher than that of the inner film layer.

As indicated from the foregoing, the inner film layer of the multilayer film and bag structure of this invention provides low temperature mechanical strength properties thereto such as impact strength and puncture resistance, while also having the ability to withstand elevated temperatures such as during cooking or reheating foods. The outer film layer of the multilayer film and bag structure of this invention serves to maintain the inner, more thermally susceptible, food contact film layer out of contact with the surfaces of the cooking or heating vessel, and thus improves the ability of the film and bag structure to withstand elevated temperatures.

In a still further embodiment, the thermoplastic film and bag structure of this invention comprises a monolayer film comprising a blend of a polypropylene copolymer with between about 5 percent and about 40 percent by weight of a resin material selected from the group consisting of (a) very low density polyethylene, (b) polybutylene, (c) a copolymer of ethylene-methyl acrylate, and (d) polyisobutylene, based on the weight of the blend. In some embodiments, the weight percent is between about 5 percent and about 30 percent by weight. In other embodiments, the material is presented between about 20 percent and about 40 percent by weight and preferably between about 20 percent and about 30 percent by weight.

In yet another embodiment, the thermoplastic film and bag structure of this invention comprises a monolayer film comprising a blend of a polypropylene copolymer with between about 5 percent and about 40 percent by weight of a mixture of resin materials selected from the group consisting of (a) very low density polyethylene and polybutylene, (b) very low density polyethylene and a copolymer of ethylene-methyl acrylate, (c) very low density polyethylene and polyisobutylene, (d) polybutylene and a copolymer of ethylene-methyl acrylate, (e) polybutylene and polyisobutylene, and (f) a copolymer of ethylene-methyl acrylate and polyisobutylene, based on the weight of the blend.

The polypropylene copolymer material present in the film and bag structure of this invention is preferably a random poly(propylene-ethylene) copolymer resin having a melt flow rate of between about 3 decigrams per minute and about 10 decigrams per minute, and a density of about 0.90 g/cm$^3$, such as commercially available from Himont, Inc., Wilmington, Del., under the tradenames PRO-FAX SA-861 and PRO-FAX SA-752, or from Exxon Chemical Americas, Houston, Tex., under the designation ESCORENE PD-9012, because such polypropylene copolymer material possesses desirable extrusion characteristics and physical properties for use herein. Further, the poly(propylene-ethylene) copolymer material preferably contains up to about 5 percent by weight of a slip agent masterbatch material selected from the group consisting of (a) about 95 weight percent of polypropylene having a melt flow rate of about 12 decigrams per minute, and about 5 weight percent of an erucamide slip agent, such as available from Ampacet, Mount Vernon, N.Y., under the designation Product 40254, and (b) about 95 weight percent of a polyethylene-methyl acrylate copolymer having a melt index of about 2 decigrams per minute, and about 5 weight percent of an erucamide slip agent such as available from Ampacet, Mount Vernon, N.Y., under the designation Product 10110.

In the best mode of this invention, the polyisobutylene material present in the inner film layer of the multilayer film structures is added via a polyisobutylene concentrate having a ratio of about two parts polyisobutylene to one part polypropylene which as a component of the inner film layer has a melt flow rate of between about 0.3 and about 10.0 decigrams per minute, and a specific gravity of between about 0.90 g/cm$^3$ and about 0.92 g/cm$^3$. Polyisobutylene materials useful as the component in the concentrate in this embodiment are generally characterized by: (1) a viscosity average molecular weight of 64,000–135,000, when determined by the Staudinger method, or by an average molecular weight of 999,000 to about 2,100,000, when determined by the Flory method; (2) an intrinsic viscosity between about 2.40–4.30; and (3) a density of about 0.92 g/cm$^3$. Such polyisobutylene materials are available from Exxon Chemicals, Linden, N.J., under the designation Exxon PA-30 (MFR at 230° C. of 0.5 decigrams/min, density of 0.91 g/cm$^3$ and yield of 30,400 in $^2$/lb/mil) and VISTANEX polyisobutylene. The very low density polyethylene comprises a material having a density of between about 0.88 g/cm$^3$ and about 0.90 g/cm$^3$, and a melt index of between about 0.3 and about 2.0 decigrams per minute, such as is available from Union Carbide Corporation, Danbury, Conn., under the designation UCAR FLX DFDA-1137. The polybutylene material may comprise one having a melt index of between about 2 and about 8 grams per 10 minutes, and a density of about 0.91 g/cm$^3$, such as available from Shell Chemical Company, Oakbrook, Ill., under the designation Shell 8340. The ethylene-methyl acrylate copolymer material may be one having a melt index of between about 1 and about 10 grams per 10 minutes, and a density of about 0.94 g/cm$^3$, such as available from Gulf Oil Chemicals Company, Orange, Tex., under the designation Gulf PE 2207. The measurements of the various polymers are carried out according to ASTM Test Method D-1238 using Condition L (polyisobutylene and polypropylene) or Condition E (low density polyethylene, ethylene-methyl acrylate and poly-1-butene).

It has been found that polypropylene homopolymers generally have inferior low temperature impact strength properties as compared to polypropylene copolymers. For example, copolymerizing propylene with ethylene will improve the low temperature impact strength properties thereof. However, as the ethylene content is increased in propylene-ethylene copolymers, such also undesirably lowers their melting point, and the film or film structure made therefrom loses its physical stability at elevated temperatures, for example, at such temperatures that may be encountered during microwave oven cooking conditions, i.e., between about 250° F. and about 300° F.

In accordance with the present invention, it has been found that polypropylene copolymer material when blended with between about 5 percent and about 40 percent by weight and typically between about 20 percent and about 30 percent by weight, of a material selected from the group consisting of (a) very low density polyethylene, (b) polybutylene, (c) a copolymer of ethylene-methyl acrylate, (d) and polyisobutylene, or (e) mixtures thereof, provides a multilayer film and multilayer film structure having improved low temperature impact and puncture strength properties and which are also stable at temperatures of up to about 300° F. In one embodiment the material is present in an amount between about 20 percent and about 40 percent by weight, and preferably between about 20 percent and about 30 percent by weight. Further, when very low density polyethylene, polybutylene, or a copolymer of ethylene-methyl acrylate are used in combination with approximately similar amounts of polyisobutylene up to a total concentration of about 20 percent by weight, based on the weight of the film, the polypropylene-based film and film structure has better low temperature impact and puncture strength properties than when either very low density polyethylene, polybutylene, ethylene-methyl acrylate copolymer, or polyisobutylene is alone blended with polypropylene at equivalent concentrations.

In addition, the afore-described resin compositions may be employed to make a monolayer film suitable for freezer to microwave oven cooking applications, preferably in the form of a suitable container such as a bag or pouch. In such event, the monolayer film comprises the afore-described polypropylene copolymer material blended with between about 5 percent and about 40 percent by weight, typically between about 20 percent and about 40 percent by weight of a resin material selected from the group consisting of (a) very low density polyethylene, (b) polybutylene, (c) a copolymer of ethylene-methyl acrylate, (d) polyisobutylene, and (e) mixtures thereof, based on the weight of the blend.

As indicated herein, the improved low temperature mechanical strength properties of the films of this invention are provided by incorporating therein between about 5 percent and about 40 percent by weight, based on the weight of the films, of a resin material selected from (a) very low density polyethylene, (b) polybutene, (c) a copolymer of ethylene-methyl acrylate, (d) polyisobutylene, and (e) mixtures thereof. It is desired that the films contain at least about 5 percent by weight of said resin materials in order that the films be provided with said improved low temperature mechanical strength properties, and up to about 40 percent by weight of said resin materials because greater amounts will generally undesirably reduce the melting point of the films making them less heat-resistant. Preferably, the amount of said resin materials present in the films of this invention should be no more than about 20 percent by weight, based on the weight of the films, in order to keep the melting point of the films as high as possible while obtaining the improved low temperature mechanical strength properties of the films.

Further, in the best mode of this invention, the multilayer film comprises an outer film layer of a resin material having a melting temperature which is higher than that of the inner film layer. Suitable resin materials for the outer film layer include polyesters such as polyethylene terephthalate and polybutylene terephthalate, polyamides such as nylon-6, nylon-6/6, nylon-12, polysulfones, polyaryl sulfones, and mixtures thereof.

However, it is preferred that the outer film layer comprise a polyamide, and more preferably, that the polyamide comprise nylon-6 such as that commercially available under the product designations Capron-8207 and Capron-8209 from the Allied Chemical Company. The polyamide material contemplated herein includes nylons prepared by condensation of a dibasic acid and a diamine, and those formed by polymerization by addition reactions of amine compounds that contain both acid and amine groups on the monomer. Examples of the first type of polyamide are nylon-6/6, nylon-6/9, nylon-6/10 and nylon-6/12. An example of nylon polymerized by the addition reaction of ring compounds and, which is particularly preferred, is nylon-6, polymerized from ε-caprolactam to form polycaproamide. In addition, copolymers of the aforementioned polyamide materials are also suitable for the outer film layer herein.

In the best mode, the multilayer film structure of this invention comprises the afore-described inner film layer and the afore-described outer film layer bonded together by a bonding layer. The bonding layer preferably comprises a polypropylene-based bonding resin such as available from Chemplex Company, Rolling Meadows, Ill., under the designation Plexar 2511, or from Mitsui Petrochemical Industries, Ltd., Houston, Tex., under the designation Admer 500. However, other suitable bonding materials may be employed such as adhesive resins selected from ionomer copolymers, modified polyolefins, ethylene-vinyl acetate copolymers, ethylene-acrylic acid copolymers, polyolefins grafted with acrylic acid, and other multipolymer compositions. The chemically modified polyolefin may be obtained from a number of polyolefin resins, such as high, medium and low density polyethylenes, polypropylenes, ethylene-vinyl acetate copolymers, and ethylene-acrylic acid copolymers, which are modified by the provision of functional groups to the polymer which have a strong affinity for the nylon molecule, and which will form strong bonds to nylon under the heat and pressure involved in the coextrusion process. These bonding materials are generally commercially available, for example, ionomer copolymers may be obtained from E. I. Du Pont de Nemours and Company under the tradename SURLYN resin. Likewise, the modified polyolefins are available from Chemplex Company of Rolling Meadows, Ill., under the tradename PLEXAR resins, such as Plexar-3 which is a modified ethylene-vinyl acetate copolymer adapted for cast film coextrusion. Other suitable multipolymer compositions include those commercially available such as CXA-3101, from E. I. Du Pont de Nemours and Company. The bonding layer material should comprise an adhesive resin having a high melting point and resistance to heat, and the bonding layer should be sufficient to provide a bonding strength between the inner film layer and the outer film layer of at least about 200 grams/inch of film.

The total thickness of the multilayer films and film structures of this invention preferably range from between about 0.5 mil to about 10 mils, more preferably from between about 1 mil to about 5 mils, and even more preferably, from about 1.5 mils to about 3 mils. The thickness of the inner film layer may range from about 0.4 mil to about 8 mils, and preferably from about 0.5 mil to about 2 mils. The thickness of the outer film layer may range from about 0.1 mil to about 1 mil, preferably from about 0.15 mil to about 0.8 mil. The bonding layer between the inner film layer and the outer film layer of the multilayer films of this invention may have any suitable thickness. Typically, the thickness of the bonding layer may be from about 0.1 mil to about 0.5 mil, preferably about 0.15 mil, or the thickness of the bonding layer may range from about 10 percent to about 20 percent of the total thickness of the multilayer films. When the multilayer films are used in making food bags or containers, the total thickness of the films is preferably between about 0.75 mil and about 4.0 mils.

The multilayer films of this invention may have an outer film layer to inner film layer thickness ratio of between about 1:2 and about 1:20, but the preferred outer film layer to inner film layer thickness ratio is between about 1:3 and about 1:8.

It is desired that the multilayer films of this invention have the aforementioned thicknesses and film layer thickness ratios because the cost of the outer film layer material is typically expensive but it should be sufficiently thick to protect the inner film layer at elevated temperatures, and the thickness of the inner film layer should be sufficient to obtain good moisture barrier and high temperature resistance properties, while providing a film having overall toughness.

The total thickness of the monolayer films of this invention may range from about 0.5 mil to about 5 mils, preferably from about 1 mil to about 4 mils, and more preferably from about 1 mil to about 3 mils.

The multilayer films of this invention may be produced by any of several well-known methods. Preferably, the films may be produced by what is commonly known as the slot cast extrusion method. The films may also be produced by what is commonly known as the air blown film tubular extrusion method, but this latter method is less preferred. The slot cast method produces a film of better clarity than the other methods known to the art. The multilayer film may be slot cast on extrusion equipment using a slot cast multiple-orifice die or a multilayer adapter for a single layer slot cast die.

Further, the film structures of this invention may be formed into containers such as food bags or pouches with or without gusseted portions. For example, the containers may have a gusset in one or more side edges of the sidewalls of the containers, and/or a gusseted portion in the bottom portion of the containers. In addition, when the film structures are formed into containers, the containers may be provided with a closure device such as a simple string or twist tie, or the closure device may comprise an interlocking closure fastening device having any desired structural configuration. Typically, in such event, the closure device is positioned at the mouth portions of the container to facilitate opening and closing the container.

As indicated above, the film structures of this invention are particularly suited for fabrication into bags useful for the containment of foodstuffs to be heated to a preparation temperature. These bags are generally defined by a structure resulting from folding the film to form a generally U-shaped trough and then side sealing both ends of the trough to form a simple bag or pouch. In use, the consumer will place food to be prepared, or to be reheated, inside of the pouch and close the top by some suitable means, as previously indicated. In forming a bag of this type, the outer layer will be the resin material having a melting temperature which is higher than that of the inner film layer, for example, a nylon film for that surface which comes into direct contact with the cooking or reheating vessel. The outer film layer maintains the inner, more thermally susceptible food contact layer out of contact with the surfaces of the cooking vessel and hence improves the bag's ability to withstand higher temperatures. Nylon-6, for example, has a melting or sticking temperature on the order of above 410° F., is heat-stable, and will not stick to the vessel side walls while foodstuffs are being reheated or cooked therein. The bag containing foodstuffs is intended to be immersed in a fluid such as water or employed in a microwave oven for reheating and/or cooking.

The invention will become more clear when considered together with the following examples which are set forth as being merely illustrative of the invention and which are not intended, in any manner, to be limitative thereof. Unless otherwise indicated, all parts and percentages are by weight.

In the following examples, the films and film structures of this invention were prepared by a slot cast and slot cast coextrusion process. Materials were dry blended in a drum-type tumble blender and fed to conventional type extruders. The extruder melt was fed through a coextrusion feed block and a conventional "T" or coat hanger type die. The extrudate from the die was cast on a typical chill roll casting system.

In addition, in the following examples, the impact resistance and puncture resistance of the thermoplastic films of this invention were evaluated as follows. The impact resistance of plastic films was determined by measuring the residual energy of a free-falling dart after passing through the film sample. The instrument, Kayeness, Inc. model D-2090, with cryogenics (option C), actually measures velocity differences of the dart speed caused by the resistance of the test sample. A dart of sufficient weight to pass through the film is dropped from a given height, and the free-falling dart energy absorbed by the test sample is determined from velocity readings obtained by means of light-activated digital chronographs located below the test sample. This test procedure is pursuant to A.S.T.M. D-4272-83.

The puncture resistance of plastic films was determined using an Instron Tensile-Compression Tester model #1122 with Environmental Chamber part #3111-541. In this test, a probe is passed through a test film at a constant speed of 20 in/min. The load force required to elastically deform and ultimately puncture the test sample is recorded, along with the amount of elongation that occurs with deformation. Puncture resistance is defined as the force required to rupture a test specimen and the energy absorbed by the film during rupture.

EXAMPLE I

To evaluate the low-temperature physical properties and suitability for food freezer application of the film compositions of this invention, total energy impact tests and puncture toughness tests as afore-described were conducted on an unmodified polypropylene copolymer monolayer film structure and compared to modified polypropylene copolymer monolayer film structures. These measurements were made at 32° F. and 0° F.

The polypropylene copolymer material was a random poly(propylene-ethylene) copolymer resin having a melt flow rate of about 7 decigrams per minute and a density of about 0.90 g/cm$^3$ commercially available from Himont, Inc., Wilmington, Del., under the designation PRO-FAX SA-861.

The materials employed to modify the polypropylene copolymer monolayer film structures were selected from (a) polybutylene having a melt index of about 4 grams per 10 minutes, and a density of about 0.91 g/cm$^3$, available from Shell Chemical Company, Oakbrook, Ill., under the designation Shell 8340; (b) a copolymer of ethylene-methyl acrylate having a melt index of about 6 grams per 10 minutes and a density of about 0.94 g/cm$^3$, available from Gulf Oil Chemicals Company, Orange, Tex., under the designation Gulf PE 2207; (c) polyisobutylene added via a polyisobutylene concentrate having a ratio of about 2 parts polyisobutylene to 1 part of polypropylene, having a melt flow of about 0.50 decigrams per minute and a specific gravity of about 0.91 g/cm$^3$, available from Exxon Chemicals, Linden, N.J., under the designation Exxon PA-30, and (d) very low density polyethylene having a density of about 0.906 g/cm$^3$ and a melt index of about 0.8 decigrams per minute, available from Union Carbide Corporation, Danbury, Conn., under the designation UCAR FLX DFDA-1137.

The modifier materials were mixed with the polypropylene copolymer material at a concentration of 10 percent, 20 percent, and 30 percent by weight, based on the weight of the combined polypropylene copolymer and modifier materials, then the mixtures were cast into films each having a thickness of about 2.0 mils.

The results of the tests for total energy impact and puncture toughness on the films containing up to 30 percent by weight of the modifier materials, based on the weight of the modified polypropylene copolymer monolayer film, are shown graphically in FIGS. 1-4. In FIGS. 1-4, PB stands for polybutylene, EMA stands for the ethylene-methyl acrylate copolymer, PIB stands for polyisobutylene, and VLDPE stands for very low density polyethylene.

Figure 1:
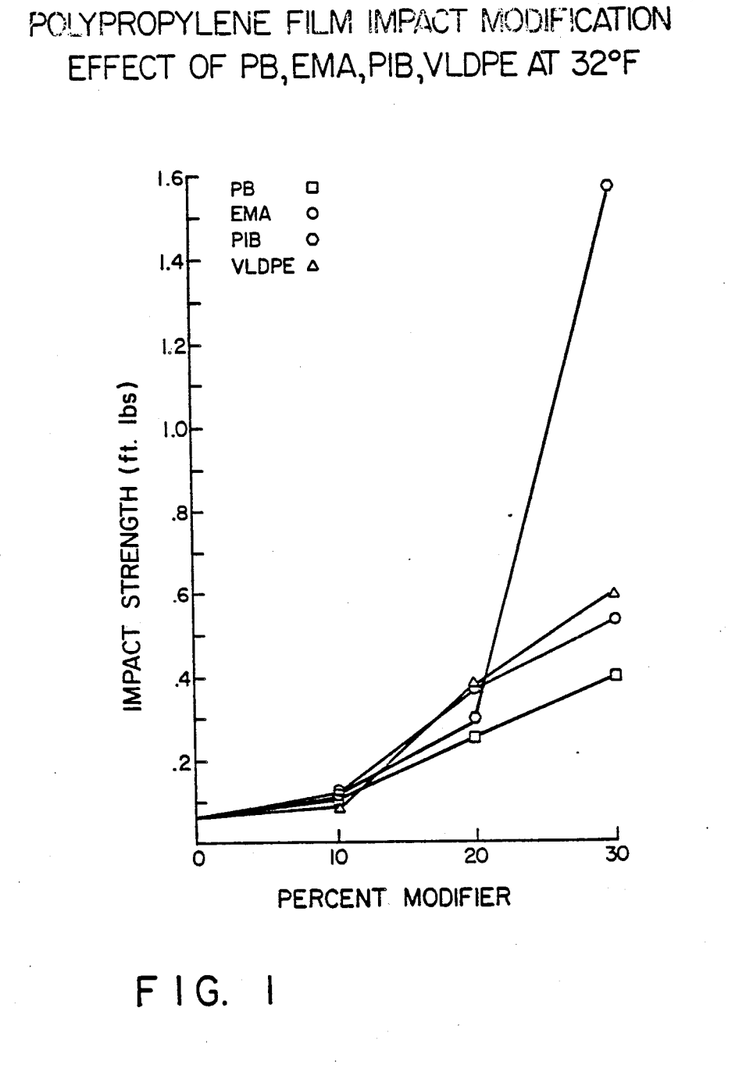
Figure 2:
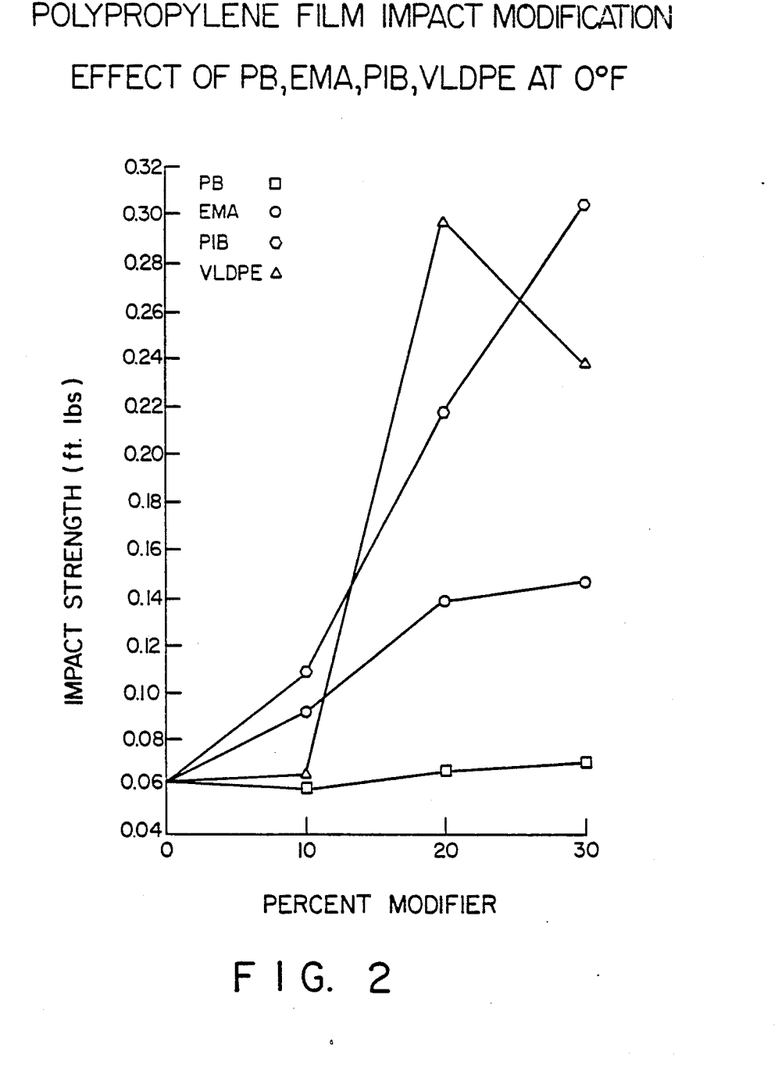
Figure 3:
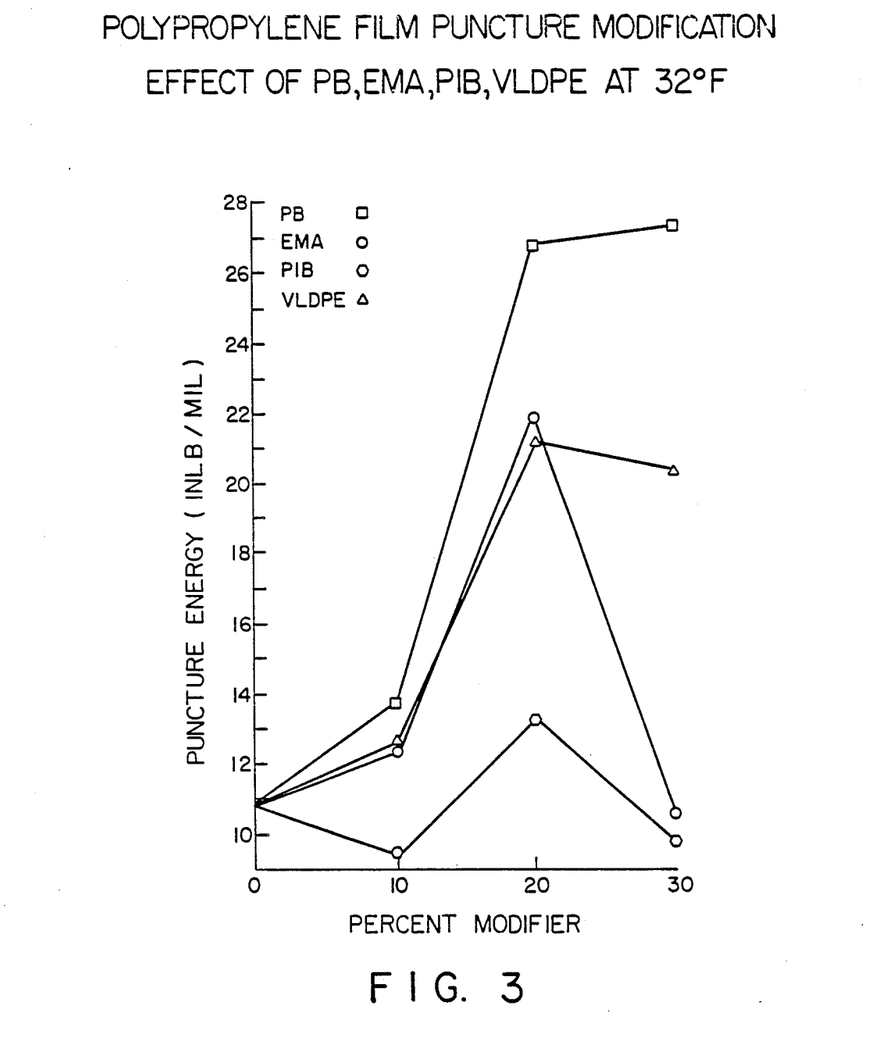
Figure 4:
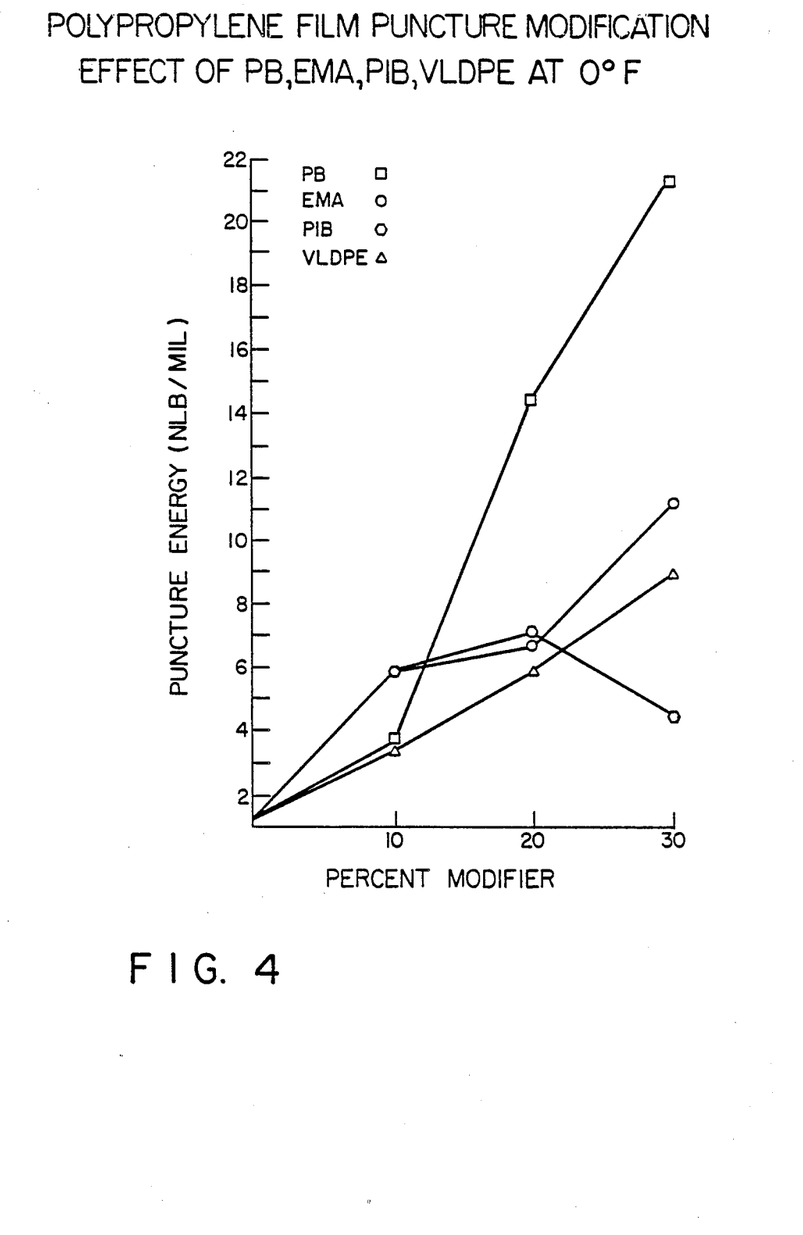

From FIGS. 1-4, it may be seen that all of the modifier components have some effect on the low temperature properties of the film at concentrations of up to 30 percent. Although use of the modifier polyisobutylene shows a significant improvement in impact strength properties (FIG. 1 and FIG. 2), it is less effective as a low temperature puncture energy modifier (FIG. 3 and FIG. 4). Conversely, polybutylene is not as effective an impact modifier, however, it provides a significant improvement in puncture toughness to the films. FIGS. 1-4 thus illustrate how monolayer films can be formulated in accordance with this invention to provide the most favorable balance of low temperature physical properties for a particular end use.

EXAMPLE II

In this example, it is shown that when very low density polyethylene, polybutylene, or ethylene-methyl acrylate copolymer is used in combination with similar amounts of polyisobutylene, up to a total concentration of about 10 percent by weight, based on the weight of the film, the polypropylene-based monolayer film has better low temperature impact and puncture strength properties than when any of these components or polyisobutylene is alone blended with the polypropylene material of Example I at equivalent concentrations. This synergistic effect on the properties of the films at 0° F. and 32° F. is shown in Tables I and II. Table I gives the impact strength properties of the films, and Table II shows the improvement in puncture strength of the films, as indicated by the increase in puncture energy values. All of the films tested had a thickness of about 2 mils.

TABLE I

Effect of Modifier on Impact Strength of Polypropylene Film

| Modifier | Impact Energy (ft-lb) | |
|---|---|---|
| | 0° F. | 32° F. |
| None | 0.063 | 0.059 |
| 10% PIB | 0.108 | 0.117 |
| 10% PB | 0.059 | 0.112 |
| 5% PB, 5% PIB | 0.111 | 0.218 |
| 10% EMA | 0.092 | 0.124 |
| 5% EMA, 5% PIB | 0.106 | 0.234 |
| 10% VLDPE | 0.066 | 0.092 |
| 5% VLDPE, 5% PIB | 0.126 | 0.154 |

PIB stands for polyisobutylene as in Example I.
PB stands for polybutylene as in Example I.
EMA stands for ethylene-methyl acrylate copolymer as in Example I.
VLDPE stands for very low density polyethylene as in Example I.

TABLE II

Effect of Modifier on Puncture Strength of Polypropylene Film

| Modifier | Puncture Energy (in-lb/mil) | |
|---|---|---|
| | 0° F. | 32° F. |
| None | 1.26 | 10.87 |
| 10% PIB | 5.88 | 9.41 |
| 10% PB | 3.72 | 13.78 |
| 5% PB, 5% PIB | 8.37 | 17.18 |
| 10% EMA | 5.89 | 12.43 |
| 5% EMA, 5% PIB | 6.47 | 18.22 |
| 10% VLDPE | 3.47 | 12.62 |
| 5% VLDPE, 5% PIB | 8.43 | 18.09 |

PIB stands for polyisobutylene as in Example I.
PB stands for polybutylene as in Example I.
EMA stands for ethylene-methyl acrylate copolymer as in Example I.
VLDPE stands for very low density polyethylene as in Example I.

EXAMPLE III

This example shows the synergistic effect of modifying the inner layer of a polypropylene-based film having the same composition, as the Example I monolayer, with very low density polyethylene, polybutylene, ethylene-methyl acrylate copolymer, and polyisobutylene, alone or in combination. The inner polypropylene-based layer had a thickness of about 1.55 mils. The outer layer of the multilayer film was comprised of nylon-6, available as Capron 8209 from Allied Chemical Company, and had a film thickness of about 0.30 mils. The inner layer and outer layer had between them a bonding layer comprised of a polypropylene-based bonding resin available from Mitsui Petrochemical Industries, Inc., Houston, Tex., under the designation Admer 500, and which was present in a thickness of about 0.15 mil.

The films were prepared by coextrusion into multilayer films. Other than the control multilayer film, all of the films contained a total of 20 weight percent of modifier(s).

Table III shows the total energy low temperature impact values obtained on the multilayer films. It can be seen from Table III that all of the multilayer film compositions containing either polybutylene, ethylene-methyl acrylate copolymer, or very low density polyethylene, combined with approximately an equivalent amount of polyisobutylene, had higher low temperature total energy impact values than those obtained for the films containing the individual modifier components blended with the polypropylene copolymer. Table III is as follows.

TABLE III

Effect of Low Temperature Impact Modifiers on Coextruded Multilayer Film

| Polypropylene Layer Modification | Impact Energy (ft-lb) | |
|---|---|---|
| | 0° F. | 32° F. |
| No Modifier | 0.128 | 0.289 |
| 20% PB | 0.118 | 0.233 |
| 20 EMA | 0.125 | 0.334 |
| 20% VLDPE | 0.197 | 0.347 |
| 20% PIB | 0.184 | 0.109 |
| 10% PB + 10% PIB | 0.209 | 0.448 |
| 10% EMA + 10% PIB | 0.257 | 0.385 |
| 10% VLDPE + 10% PIB | 0.233 | 0.366 |

PB stands for polybutylene as in Example I.
EMA stands for ethylene-methyl acrylate copolymer as in Example I.
VLDPE stands for very low density polyethylene as in Example I.
PIB stands for polyisobutylene as in Example I.

EXAMPLE IV

To evaluate the low temperature impact strength properties of the film compositions and film structures of this invention, actual end-use tests were conducted on quart-size pouches having a dimension of about 7 inches in width and about 8 inches in length. The pouches were constructed from the test films shown in Table IV below and filled with water, sealed, and placed in a freezer maintained at a temperature of about −5° F. After freezing the contents, the pouches were systematically handled, simulating normal consumer treatment in the freezer, thawed, and examined for holes and cracks in the film caused by impact stress. The results are summarized in Table IV.

In Table IV, PP-861 stands for a random polypropylene copolymer available from Hercules, Inc., Wilmington, Del., under the product designation PRO-FAX SA-861. The designation 7042 stands for a linear, low density polyethylene material having a density of about 0.918 g/cm$^3$ available from Union Carbide Corporation, Danbury, Conn., under product code 7042. The designation 7047 stands for a linear, low density polyethylene material having a density of about 0.918 g/cm$^3$ available from Union Carbide Corporation, Danbury, Conn., under product code 7047. The designation 1137 stands for a very low density polyethylene material having a density of about 0.900 g/cm$^3$ available from Union Carbide Corporation, Danbury, Conn., under the product name UCAR FLX DFDA-1137. The designation Plexar 2511 stands for a polypropylene-based bonding resin available from Chemplex Company, Rolling Meadows, Ill., under the product name Plexar 2511. The nylon-6 material stands for a polyamide material available from Allied Chemical Company under the product name Capron-8209 and which has a density of about 1.13 grams per cubic centimeter, and a tensile yield of about 11,800 psi per ASTM method P-638.

TABLE IV

Polypropylene-Modified Multilayer Film Freezer Tests

| | | Film Compositions (Gauge Mils) | | |
|---|---|---|---|---|
| Test Film | Inner Layer (1.15) | Bonding Layer (0.15) | Outer Layer (0.30) | Freezer Handling % Failure |
| 1 | PP-861 | Plexar 2511 | Nylon-6 | 58 |
| 2 | PP-861 + 10% 7042 | Plexar 2511 | Nylon-6 | 43 |
| 3 | PP-861 + 10% 7047 | Plexar 2511 | Nylon-6 | 75 |
| 4 | PP-861 + 10% 1137 | Plexar 2511 | Nylon-6 | 26 |

PP-861 stands for polypropylene copolymer
7042 stands for low density polyethylene
7047 stands for low density polyethylene
1137 stands for very low density polyethylene It can be seen from Table IV that modifying the inner layer film composition of polypropylene (film 1) with a very low density polyethylene (film 4) significantly improves the low temperature impact strength properties of the multilayer film as reflected by the much lower percentage of bag failures from the freezer handling test. It can also be seen from the test results shown in Table IV that modifying the inner layer film composition of polypropylene (film 1) with a very low density polyethylene (film 4) provides a greater improvement in the low temperature impact strength properties of polypropylene than polypropylene blended with a low density polyethylene material (films 2 and 3).

To further show the advantages of very low density polyethylene (VLDPE) as a low temperature impact modifier for polypropylene film, the low temperature (32° F.) impact strength was determined on single layer polypropylene films modified with very low density polyethylene or low density polyethylene at concentrations of 10 percent, 20 percent, and 30 percent by weight of the films. In Table V below, it can be seen that very low density polyethylene is significantly more effective than low density polyethylene, and especially at concentrations of 20 percent and 30 percent. All of the films tested in this example had a thickness of about 2 mils.

TABLE V

Polypropylene-Modified Film Low Temperature Impact Tests

| Film Composition | Impact Energy at 32° F. (ft-lbs) |
|---|---|
| PP-861 | 0.059 |
| PP-861 + 10% 1137 | 0.092 |
| PP-861 + 20% 1137 | 0.382 |
| PP-861 + 30% 1137 | 0.605 |
| PP-861 + 10% 7042 | 0.175 |
| PP-861 + 20% 7042 | 0.253 |
| PP-861 + 30% 7042 | 0.231 |

EXAMPLE V

In a separate series of evaluations, multilayer films were extruded, the films were formed into pouches, and actual end-use tests were performed on the pouches constructed from the test films as described in Example IV. The results are summarized in Table VI below.

TABLE VI

Polypropylene-Modified Multilayer Film Freezer Tests

| | | Film Compositions (Gauge Mils) | | |
|---|---|---|---|---|
| Test Film | Inner Layer (1.55 mils) | Bonding Layer (0.15 mil) | Outer Layer (0.30 mil) | Freezer Handling % Failure |
| 1 | PP-861 | Admer 500 | Nylon-6 | 71 |
| 2 | PP-861 + 10% 8340 | Admer 500 | Nylon-6 | 58 |
| 3 | PP-861 + 20% 8340 | Admer 500 | Nylon-6 | 54 |
| 4 | PP-861 + 10% 2207 | Admer 500 | Nylon-6 | 33 |
| 5 | PP-861 + 20% 2207 | Admer 500 | Nylon-6 | 25 |
| 6 | PP-861 + 15% PA30 | Admer 500 | Nylon-6 | 25 |
| 7 | PP-861 + 30% PA30 | Admer 500 | Nylon-6 | 25 |
| 8 | PP-861 + 10% 1137 | Admer 500 | Nylon-6 | 38 |
| 9 | PP-861 + 20% 1137 | Admer 500 | Nylon-6 | 29 |
| 10 | PP-861 + 10% 8340 + 15% PA30 | Admer 500 | Nylon-6 | 13 |
| 11 | PP-861 + 10% 2207 + 15% PA30 | Admer 500 | Nylon-6 | 25 |
| 12 | PP-861 + 10% 1137 + 15% PA30 | Admer 500 | Nylon-6 | 9 |

PP-861 stands for a random polypropylene copolymer
840 stands for polybutylene
2207 stands for ethylene-methyl acrylate copolymer
PA 30 stands for polyisobutylene concentrate (2:1 PIB:PP)
1137 stands for very low density polyethylene
Admer 500 stands for polypropylene-based bonding resin Table VI shows an improvement in reduced freezer handling failures for all of the test films 2 through 12 as compared to control test film 1. Moreover, the preferred structures, test films 10 and 12, show the lowest percent freezer handling failure, and also provide a favorable synergistic effect of using polybutene or very low density polyethylene in combination with polyisobutylene compared with a blend of polyisobutylene and any of the other components, or any of the modifier components alone, with the polypropylene copolymer material.

EXAMPLE VI

This example compares, on a qualitative basis, the performance of commercially available containers for use as food storage containers placed in a freezer and/or as food cooking containers. The commercial container products evaluated were (1) Ziploc Microfreez Microwave Cooking Bags marketed by Dow Chemical Company, Midland, Mich.; (2) Seal-A-Meal Boilable Cooking Pouches marketed by Dazey Products Company, Industrial Airport, Kansas; (3) Hefty Baggies Extra Protection Freezer Bags marketed by Mobil Oil Corporation, Pittsford, N.Y.; (4) Reynolds Oven Cooking Bags marketed by Reynolds Metals Company, Richmond, Va.; and (5) Ziploc Heavy Duty Bags, quart size, marketed by Dow Chemical Company, Indianapolis, Ind.

Initially, the containers were examined for flaws such as cracks, rips, or holes. The number of flaws were totalled and recorded. The Ziploc Microfreez container was considered generally adequate for the aforementioned uses in that the multilayer sidewall construction comprises an inner layer of high density polyethylene having a thickness of about 2 mils which provides thereto good low temperature impact properties and is thick enough to be abrasion resistant, and also comprises an outer layer of nylon which adds to the impact toughness of the container walls.

The Seal-A-Meal container was also considered generally acceptable for the aforementioned uses in that the multilayer sidewall construction comprises an inner layer of polyethylene having a thickness of about 1.5 mils providing thereto good low temperature impact properties and is thick enough to be abrasion resistant, and also comprises a tough outer layer of polyethyleneterephthalate.

The Hefty Baggies container was considered generally poor for the aforementioned uses in that the film material of the sidewalls was so thin as to make it very fragile even though the film composition is believed to be very similar to that of the Ziploc Microfreez container.

The Reynolds Oven Cooking container was considered generally poor for the aforementioned uses in that the film material of the sidewalls was found to contain numerous holes.

The Ziploc Heavy Duty bags, quart size, were considered extremely poor for the aforementioned uses in that the polyethylene film material of the sidewalls does not possess satisfactory abrasion resistance to resist scuffing in a freezer.

In comparison, the modified polypropylene films of this invention have a melting point of about 314° F. which makes them useful at elevated temperatures for cooking or reheating various foods. Further, Table VII summarizes the performance of these containers in actual low temperature end-use tests. As shown therein, the modified polypropylene film structures of this invention are superior to the commercial containers tested.

TABLE VII

Commerical Products in Freezer Tests

| Product | Inner Layer (Gauge Mils) | Outer Layer (Gauge Mils) | Freezer Handling % Failure |
|---|---|---|---|
| Dow Ziploc Microfreez Microwave Cooking Bags | HDPE (1.70) | Nylon-6 (0.50) | 27 |
| Dazey Seal-A-Meal Boilable Cooking Pouches | PE (1.5) | PET (0.50) | 40 |
| Hafty Baggies Extra Protection Freezer Bags | HDPE (1.10) | Nylon-6 (0.10) | 50 |
| Dow Ziploc Heavy Duty Bags | PE (2.7) | — | 75 |
| Reynolds Oven Cooking Bags | Nylon-6/6,6 CO (1.0) | — | 100 |
| This Invention, Film A | PP-861 + 10% 2207 + 15% PA30 (1.55) | Nylon-6 (0.30) | 25 |
| This Invention, Film B | PP-861 + 10% 8340 + 15% PA30 (1.55) | Nylon-6 (0.30) | 13 |
| This Invention, Film C | PP-861 + 10% 1137 + 15% PA30 (1.55) | Nylon-6 (0.30) | 9 |

In Table VII, HDPE stands for high density polyethylene; PE stands for polyethylene, PP-861 stands for a polypropylene random copolymer; 2207 stands for ethylene-methyl acrylate copolymer; PA30 stands for polyisobutylene concentrate having a ratio of 2 parts of polyisobutylene to 1 part of polypropylene; 8340 stands for polybutylene; 1137 stands for very low density polyethylene; and PET stands for polyethylene terephthalate.

In summary, although certain embodiments of the present invention have been described and set forth in detail, it should be further understood that other embodiments of the invention are contemplated by way of changes, modifications and variations to the description without departing from the scope and spirit of the invention as set forth in the appended claims. Such changes, modifications and variations are within the scope of this invention.

What is claimed is:

1. A low temperature impact and puncture resistant thermoplastic multilayer film comprising an inner film layer comprising a blend of polypropylene copolymer with between about 5 percent and about 40 percent by weight of a resin material selected from the group consisting of (a) very low density polyethylene, (b) polybutylene, (c) a copolymer of ethylene-methyl acrylate, and (d) polyisobutylene, based on the weight of said blend; and an outer film layer comprising a resin material having a melting temperature which is higher than that of said inner film layer.

2. A low temperature impact and puncture resistant thermoplastic multilayer film in accordance with claim 1 wherein said polypropylene copolymer comprises a random poly(propylene-ethylene) copolymer resin having a melt flow rate of between about 3 decigrams per minute and about 10 decigrams per minute, and a density of about 0.90 g/cm$^3$.

3. A low temperature impact and puncture resistant thermoplastic multilayer film in accordance with claim 1 wherein said polyisobutylene has a viscosity average molecular weight (Staudinger Method) of between about 64,000 and about 135,000, an intrinsic viscosity between about 2.4 and about 4.3 and about 0.92 g/cm$^3$.

4. A low temperature impact and puncture resistant thermoplastic multilayer film in accordance with claim 1 wherein said blend contains from between about 5 percent and about 30 percent by weight of said resin material, based on the weight of said blend.

5. A low temperature impact and puncture resistant thermoplastic multilayer film in accordance with claim 1 wherein said outer film layer comprises a thermoplastic resin material selected from the group consisting of polyesters, polyamides, polysulfones, polyaryl sulfones, and mixtures thereof.

6. A low temperature impact and puncture resistant thermoplastic multilayer film in accordance with claim 5 wherein said polyesters are selected from polyethylene terephthalate and polybutylene terephthalate.

7. A low temperature impact and puncture resistant thermoplastic multilayer film in accordance with claim 5 wherein said polyamides are selected from nylon-6, nylon-6/6, nylon-6/9, nylon-6/10, nylon-12, nylon-6/12, and copolymers and mixtures thereof.

8. A low temperature impact and puncture resistant thermoplastic multilayer film in accordance with claim 1 further including a bonding layer between said inner film layer and said outer film layer.

9. A low temperature impact and puncture resistant thermoplastic multilayer film in accordance with claim 8 wherein said bonding layer comprises a polyolefin-based resin.

10. A low temperature impact and puncture resistant thermoplastic multilayer film in accordance with claim 1 having a thickness of from about 0.5 mil to about 10 mils.

11. A low temperature impact and puncture resistant thermoplastic multilayer film in accordance with claim 1 in the form of a container.

12. A low temperature impact and puncture resistant thermoplastic multilayer film in accordance with claim 11 wherein said container includes a closure means.

13. A low temperature impact and puncture resistant thermoplastic multilayer film according to claim 1 wherein said resin material is present in an amount between about 20 and about 40 percent by weight.

14. A low temperature impact and puncture resistant thermoplastic multilayer film according to claim 13 wherein said resin material is present in an amount between about 20 and about 30 percent by weight.

* * * * *